US011285348B2

(12) United States Patent
Lakshmi et al.

(10) Patent No.: US 11,285,348 B2
(45) Date of Patent: Mar. 29, 2022

(54) MOUNTING ASSEMBLIES FOR FIRE AND OVERHEAT DETECTION SYSTEMS

(71) Applicant: Kidde Technologies, Inc., Wilson, NC (US)

(72) Inventors: Venkata Satish Babu Lakshmi, Karnataka (IN); Venkata Anil Kumar Mothe, Karnataka (IN); Thambiraj Avudaiappan, Karnataka (IN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 174 days.

(21) Appl. No.: 16/592,113

(22) Filed: Oct. 3, 2019

(65) Prior Publication Data
US 2021/0038935 A1 Feb. 11, 2021

(30) Foreign Application Priority Data
Aug. 8, 2019 (IN) .............................. 201911032214

(51) Int. Cl.
*G01D 11/30* (2006.01)
*A62C 37/36* (2006.01)
*B64D 45/00* (2006.01)

(52) U.S. Cl.
CPC .............. *A62C 37/36* (2013.01); *B64D 45/00* (2013.01); *G01D 11/30* (2013.01); *B64D 2045/009* (2013.01)

(58) Field of Classification Search
CPC .. A62C 37/36; B64D 45/00; B64D 2045/009; G01D 11/30
See application file for complete search history.

(56) References Cited

U.S. PATENT DOCUMENTS

| 8,607,577 B2 | 12/2013 | Ruberte Sanchez et al. |
| 8,858,173 B2 | 10/2014 | Marsal et al. |
| 9,766,427 B1 | 9/2017 | Barney et al. |
| 2011/0146944 A1 | 6/2011 | Hand et al. |
| 2019/0113391 A1 | 4/2019 | Kuppusamy |

FOREIGN PATENT DOCUMENTS

| EP | 2896852 A1 * | 7/2015 | ............ F16B 5/0241 |
| EP | 2896852 A1 | 7/2015 | |

OTHER PUBLICATIONS

European Search Report for European Application No. 19212810.6, International Filing Date Dec. 2, 2019, dated May 18, 2020, 10 pages.
US Federal Aviation Administration, "Chapter 17—Fire Protection Systems", Jan. 8, 2018, Retrieved from the Internet: URL:https://www.faa.gov/regulations_policies/handbooks_manuals/aircraft/media/amt_general_handbook.pdf [retrieved on May 7, 2020]; 22 pages.

* cited by examiner

*Primary Examiner* — Jamel E Williams
(74) *Attorney, Agent, or Firm* — Cantor Colburn LLP

(57) ABSTRACT

Mounting support assemblies for fire and overheat detection systems are described. The mounting support assemblies include a support tube connector having a first portion and a second portion, wherein a captive space is defined between the first portion and the second portion, a fastener arranged at least partially within the captive space and passing through the first portion of the support tube connector, and a biasing element arranged about the fastener and positioned between an end of the fastener and the first portion of the support tube connector, the biasing element biasing the fastener in a direction toward the second portion.

20 Claims, 6 Drawing Sheets

MOUNTING ASSEMBLIES FOR FIRE AND OVERHEAT DETECTION SYSTEMS

CROSS-REFERENCE TO RELATED APPLICATIONS

This application claims the benefit of Indian Provisional Application No. 201911032214, filed Aug. 8, 2019, the disclosure of which is incorporated herein by reference in its entirety.

BACKGROUND

The present disclosure relates generally to fire and overheat detection systems, and more particularly to support assemblies and systems for fire and overheat detection systems on aircraft and aircraft engines.

Vehicles, such as aircraft, commonly include fire and overheat detection systems for monitoring spaces within the vehicle for fire and/or overheating. Fire and overheating detection systems generally include thermal detectors and/or other types of sensor elements to provide an indication of elevated temperature and/or of fire events. The thermal detectors and/or sensor elements are typically supported within (or within line of sight of) the space monitored for fire and/or overheating, generally using a mounting structure.

In the case of gas turbine engines (e.g., for the engine of an aircraft), mounting systems are typically arranged to locate or position the thermal detector(s) and/or sensor element(s) away from the engine structure. Such positioning allows the thermal detector(s) and/or sensor element(s) to monitor temperature between the engine and a nacelle that houses the engine. Such positioning avoids the need to directly contact hot surfaces of the engine and allows the mounting system to dampen vibration communicated to the thermal detector(s) or sensor element(s) from the engine. Some such systems may employ polymeric materials and/or polytetrafluoroethylene (PTFE) materials to provide vibration damping. However, in some engine configurations, the temperature between the engine and the nacelle can rise to above those at which the polymeric materials and polytetrafluoroethylene (PTFE) materials may change state or have altered properties, e.g., becoming brittle or melting. Such changes in the material states can limit the ability of the mounting system to dampen vibration communicated to the thermal detector(s) and/or sensor element(s).

Such systems and methods have generally been acceptable for their intended purpose. However, there remains a need for improved support systems and assemblies which may provide for vibration damping or other mounting properties to thermal detector(s) or sensor element(s) within or associated with engines of vehicles.

BRIEF DESCRIPTION

According to some embodiments, mounting support assemblies for fire and overheat detection systems are provided. The mounting support assemblies include a support tube connector having a first portion and a second portion, wherein a captive space is defined between the first portion and the second portion, a fastener arranged at least partially within the captive space and passing through the first portion of the support tube connector, and a biasing element arranged about the fastener and positioned between an end of the fastener and the first portion of the support tube connector, the biasing element biasing the fastener in a direction toward the second portion.

In addition to one or more of the features described above, or as an alternative, further embodiments of the mounting support assemblies may include that the support tube connector is configured to be installed to a tube of the fire and overheat detection system.

In addition to one or more of the features described above, or as an alternative, further embodiments of the mounting support assemblies may include that the biasing element comprises one or more wave springs.

In addition to one or more of the features described above, or as an alternative, further embodiments of the mounting support assemblies may include that the biasing element is formed from steel, carbon steel, or stainless steel.

In addition to one or more of the features described above, or as an alternative, further embodiments of the mounting support assemblies may include a retainer configured to retain the biasing element within the captive space.

In addition to one or more of the features described above, or as an alternative, further embodiments of the mounting support assemblies may include that the second portion includes an aperture arranged to allow an end of the fastener to pass therethrough.

In addition to one or more of the features described above, or as an alternative, further embodiments of the mounting support assemblies may include a securing element configured to engage with a portion of the fastener.

According to some embodiments, fire and overheat detection systems are provided. The fire and overheat detection systems include at least one sensor element attached to a tube, a support tube connector at an end of the tube, the support tube connector having a first portion and a second portion, wherein a captive space is defined between the first portion and the second portion, a fastener arranged at least partially within the captive space and passing through the first portion of the support tube connector, the fastener configured to attach the support tube connector to a bracket of a vehicle, and a biasing element arranged about the fastener and positioned between an end of the fastener and the first portion of the support tube connector, the biasing element biasing the fastener in a direction toward the second portion.

In addition to one or more of the features described above, or as an alternative, further embodiments of the fire and overheat detection systems may include that the support tube connector is configured to be installed to the tube.

In addition to one or more of the features described above, or as an alternative, further embodiments of the fire and overheat detection systems may include that the support tube connector is integrally formed with the tube.

In addition to one or more of the features described above, or as an alternative, further embodiments of the fire and overheat detection systems may include that the biasing element comprises one or more wave springs.

In addition to one or more of the features described above, or as an alternative, further embodiments of the fire and overheat detection systems may include that the biasing element is formed from steel, carbon steel, or stainless steel.

In addition to one or more of the features described above, or as an alternative, further embodiments of the fire and overheat detection systems may include a retainer configured to retain the biasing element within the captive space.

In addition to one or more of the features described above, or as an alternative, further embodiments of the fire and overheat detection systems may include that the second portion includes an aperture arranged to allow an end of the fastener to pass therethrough.

In addition to one or more of the features described above, or as an alternative, further embodiments of the fire and overheat detection systems may include a securing element configured to engage with a portion of the fastener.

In addition to one or more of the features described above, or as an alternative, further embodiments of the fire and overheat detection systems may include that the bracket is an engine bracket of a gas turbine engine.

According to some embodiments, gas turbine engines are provided. The gas turbine engines include an engine case, an engine case bracket on an exterior of the engine case, and a fire and overheat detection system mounted to the engine case. The fire and overheat detection system includes at least one sensor element attached to a tube, a support tube connector at an end of the tube, the support tube connector having a first portion and a second portion, wherein a captive space is defined between the first portion and the second portion, a fastener arranged at least partially within the captive space and passing through the first portion of the support tube connector, the fastener configured to attach the support tube connector to the engine case, and a biasing element arranged about the fastener and positioned between an end of the fastener and the first portion of the support tube connector, the biasing element biasing the fastener in a direction toward the second portion.

In addition to one or more of the features described above, or as an alternative, further embodiments of the gas turbine engines may include that the biasing element comprises one or more wave springs.

In addition to one or more of the features described above, or as an alternative, further embodiments of the gas turbine engines may include a retainer configured to retain the biasing element within the captive space.

In addition to one or more of the features described above, or as an alternative, further embodiments of the gas turbine engines may include a securing element configured to engage with a portion of the fastener and secure the support tube connector to the engine case bracket.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
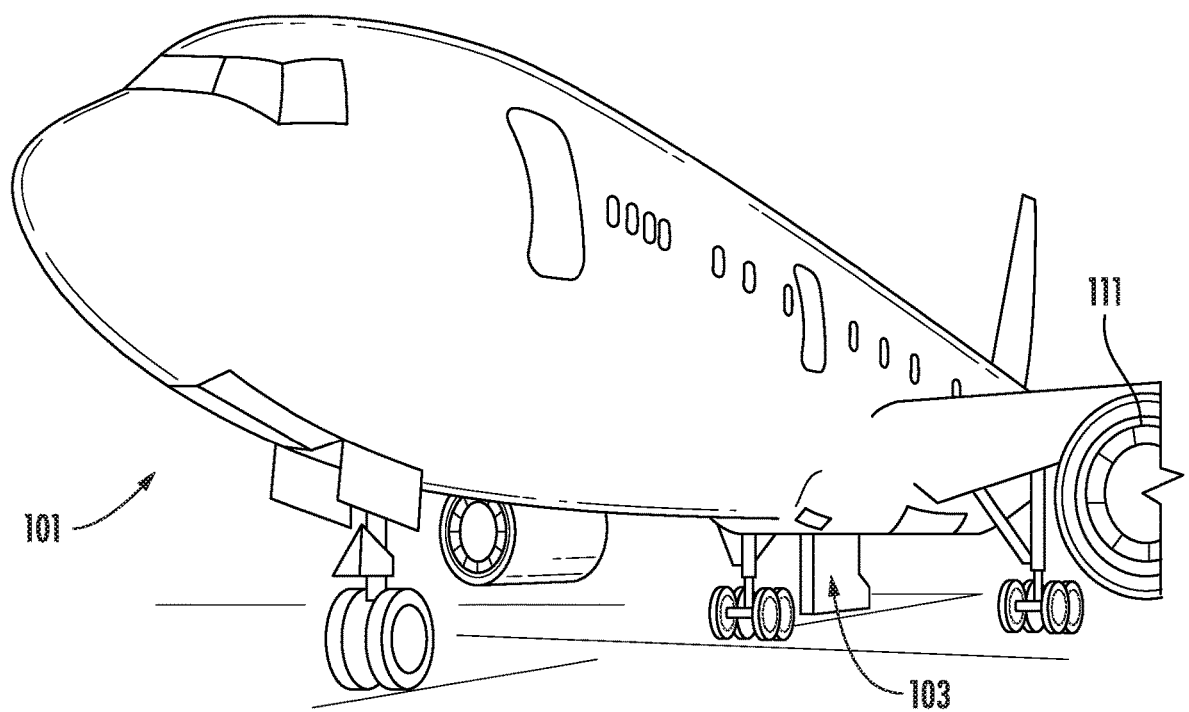
FIG. 1 is a schematic illustration of an aircraft that may employ embodiment of the present disclosure.

FIG. 1 is a schematic illustration of an aircraft 101 that can employ one or more embodiments of the present disclosure. As shown in FIG. 1, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. Also shown in FIG. 1, the aircraft 101 includes one or more engines 111. The engines 111 are typically mounted on wings of the aircraft 101, but may be located at other locations depending on the specific aircraft configuration. The engines 111 can include an engine structure that is housed within a nacelle, as will be appreciated by those of skill in the art. The nacelle is configured to mount the engine structure to the aircraft 101 and may include various features, including, without limitation, a thrust reverser and various cowls, struts, cones, nozzles, etc.

Figure 2:
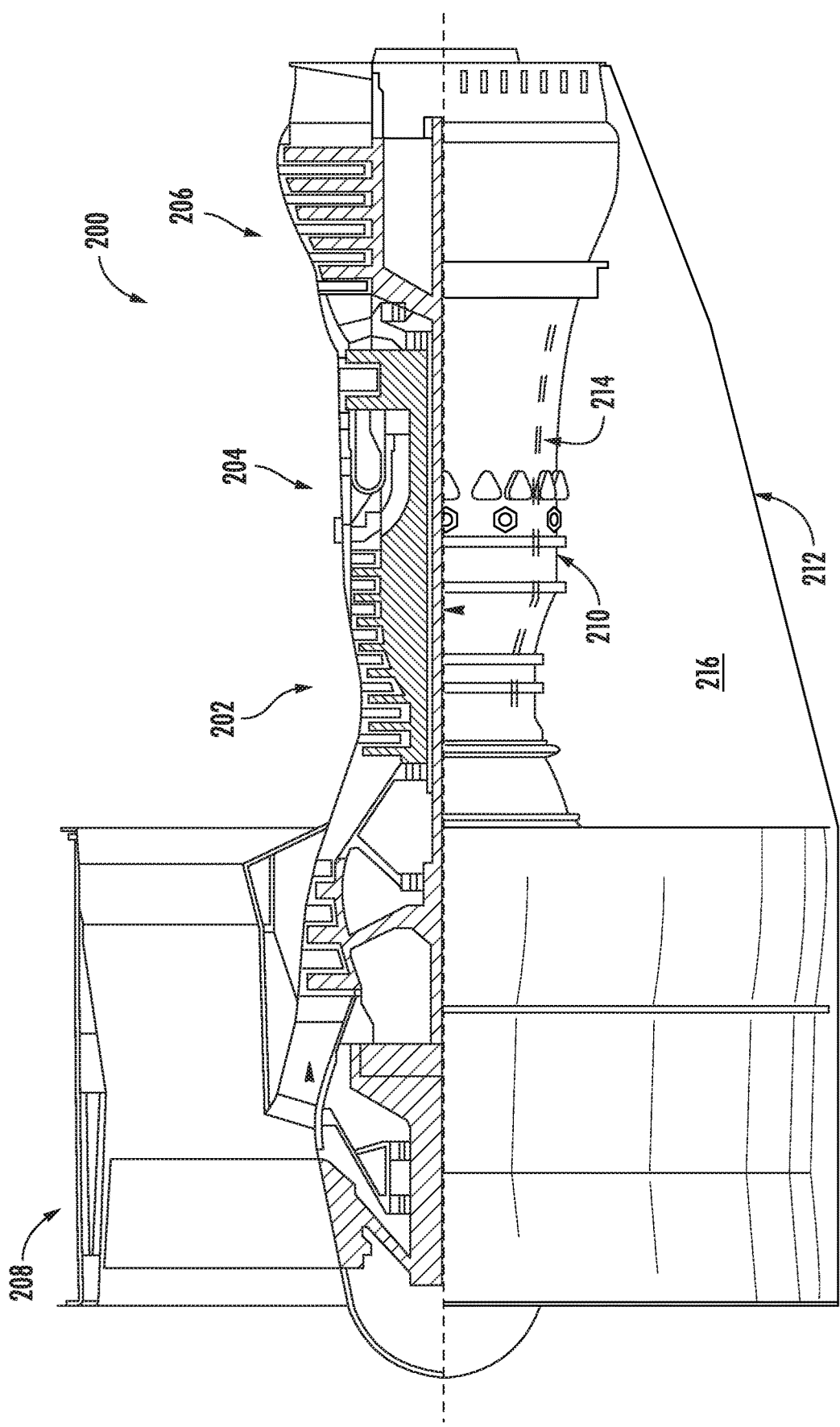
FIG. 2 is a schematic illustration of a gas turbine engine that incorporate embodiments of the present disclosure.

Referring to FIG. 2, a gas turbine engine 200 is schematically shown. The gas turbine engine 200 includes a compressor section 202, a combustion section 204, a turbine section 206, and a fan section 208. The compressor section 202, the combustion section 204, the turbine section 206, and the fan section 208 form an engine structure. The compressor section 202, the combustion section 204, and the turbine section 206 are housed within an engine case 210, and the engine structure is housed within a nacelle 212, and an overheat and fire and overheat detection system 214 arranged between the engine structure and the nacelle 212.

The nacelle 212 encloses the engine case 210 and defines therebetween a fire-protected space 216. The engine case 210 in turn encloses the engine structure (i.e., compressor section 202, combustion section 204, and turbine section 206). The compressor section 202 is operably connected to the turbine section 206. The combustion section 204 is in fluid communication with the compressor section 202 and is arranged to receive air from the compressor section 202. The combustor section 202 includes a combustor to combust the air with a fuel to generate a high pressure combustion flow that is directed toward the turbine section 206. The turbine section 206 includes one or more turbines that are arranged to extract work from the high pressure combustion flow received from the combustion section 204. The turbine section 206 will drive rotation of shaft, which may be communicated to the compressor section 202 to drive compressor elements, as known in the art.

The fire and overheat detector system 214 may include one or more sensors and/or thermal detection elements arranged along a support rail. The support rail may be mounted to or otherwise attached to the engine case 210. As will be appreciated by those of skill in the art, the engine case 210 of the gas turbine engine 200 communicates heat to the fire-protected space 216 during operation (e.g., due to heat generated in the combustion section 204). To detect an overheating of the gas turbine engine 200, the fire and overheat detection system 214 is connected or mounted to the engine case 210. The fire and overheat detection system 214 is arranged at least partially within the fire-protected space 216 and includes the sensor elements on a support structure. The support structure is connected to the engine case 210 and extends therefrom within the fire-protected space 216 and toward the nacelle 212. In some embodiments, the sensor element(s) may be mechanically damped from vibration communicated by the gas turbine engine 200. The sensor element(s) are configured to provide an indication of temperature of the engine case 210, e.g., via a resistivity change of a thermistor body. An example configuration of sensor element(s) and a fire and overheat detection system employed in embodiments of the present disclosure can be as shown and described in U.S. Pat. No. 7,098,797 B2 to Chahrour et al., issued on Aug. 29, 2006, the content of which is incorporated herein by reference in its entirety.

As will also be appreciated by those of skill in the art in view of the present disclosure, some gas turbines can communicate heat to fire protected spaces within the nacelle above temperatures at which certain materials exhibit changes in their mechanical properties. For example, in environments with temperatures above 300° Celsius, materials like polytetrafluoroethylene (PTFE) can lose their ability to provide mechanical dampening to sensor elements (e.g., by melting). Accordingly, embodiments described herein are directed to systems that do not use polytetrafluoroethylene (PTFE) or other thermoplastics, but rather provide for alternative (or in combination) vibration damping systems for fire and overheat detector system on vehicles.

Figure 3:
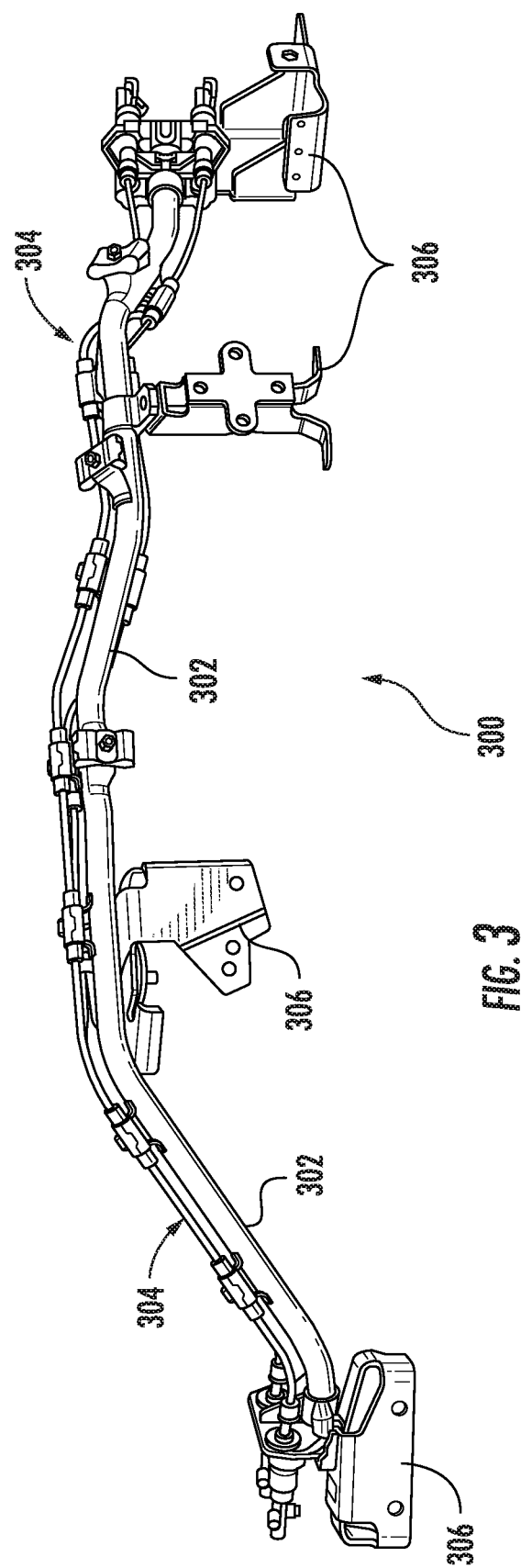
FIG. 3 is a schematic illustration of a fire and overheat detector system that may incorporate embodiments of the present disclosure.

Turning now to FIG. 3, a schematic illustration of a fire and overheat detector system 300 for use on a vehicle, such as an aircraft or aircraft engine, is shown. The fire and overheat detector system 300 may be configured to be mounted to an engine case, as described above, and arranged to detect or sense thermal conditions of a gas turbine engine, the engine case, a fire-protected space, and/or a nacelle during operation. The fire and overheat detector system 300 includes a support tube 302 that supports one or more sensor elements 304. The sensor elements 304 may be wires or sheathed wires that extend along the length of the support tube 302 of the fire and overheat detector system 300. The mounting of the fire and overheat detector system 300 to an engine case or other structure may be at one or more mounting brackets 306, which are attached to the support tube 302.

The sensor elements 304 may be continuous-type sensors that are mounted and arranged to provide a region, space, or area monitoring of thermal conditions (e.g., within a fire-protected space). The mounting brackets 306 provide for fixed mounting and positioning of the sensor elements 304 such that a desired monitoring may be achieved. For example, the fire and overheat detector system 300 may be mounted to provide thermal monitoring of various possible hot air leakage zones. However, during operation, vibration of the engine case or other structure to which the fire and overheat detector system 300 is mounted may cause damage or impact the effectiveness of the fire and overheat detector system 300.

The support tube 302 along with the mounting brackets 306 are configured to be robust enough to withstand the high vibration levels present in aircraft engines due to engine rotor unbalance loads. The mounting brackets 306, because they are fixedly connected to an engine or engine case, may amplify loads that are imparted to the sensor elements 304. That is, the rigid mount system provided by the mounting brackets 306 of the fire and overheat detector system 300 may drive high stress in the components of the fire and overheat detector system 300 (e.g., the sensor elements 304). Structural failures of the fire and overheat detector system 300 may occur during operation of an engine to which the system is mounted. Some such failures may result from resonance and high amplitude vibration, excessive deflection at an end (e.g., sensing end/free end of a sensor element 304) that induces high stresses at the root of the sensor element, and/or no damping mechanism present at the mounting location of the rail assemblies.

Figure 4B:
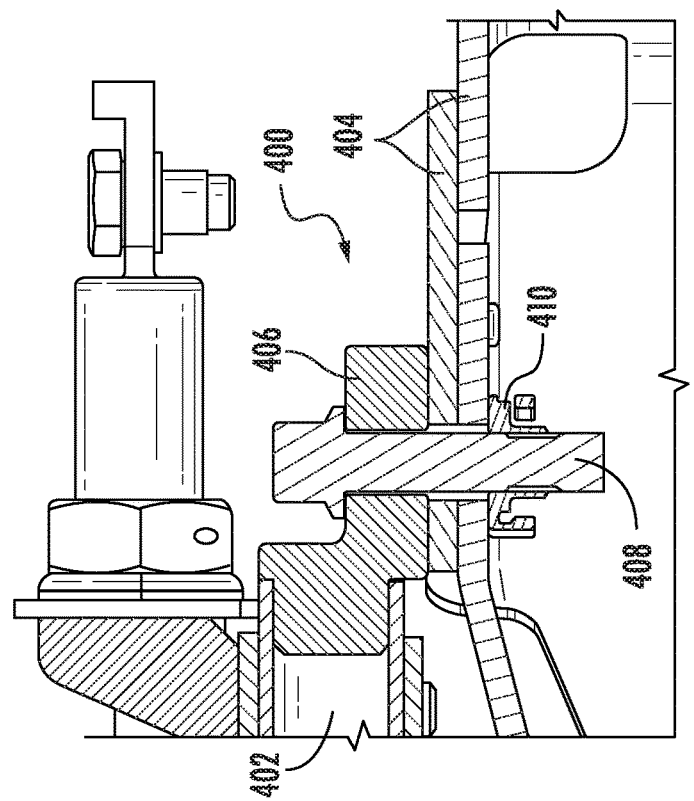
FIG. 4B is a partial cross-sectional illustration of the mounting junction shown in FIG. 4A.
Figure 4A:
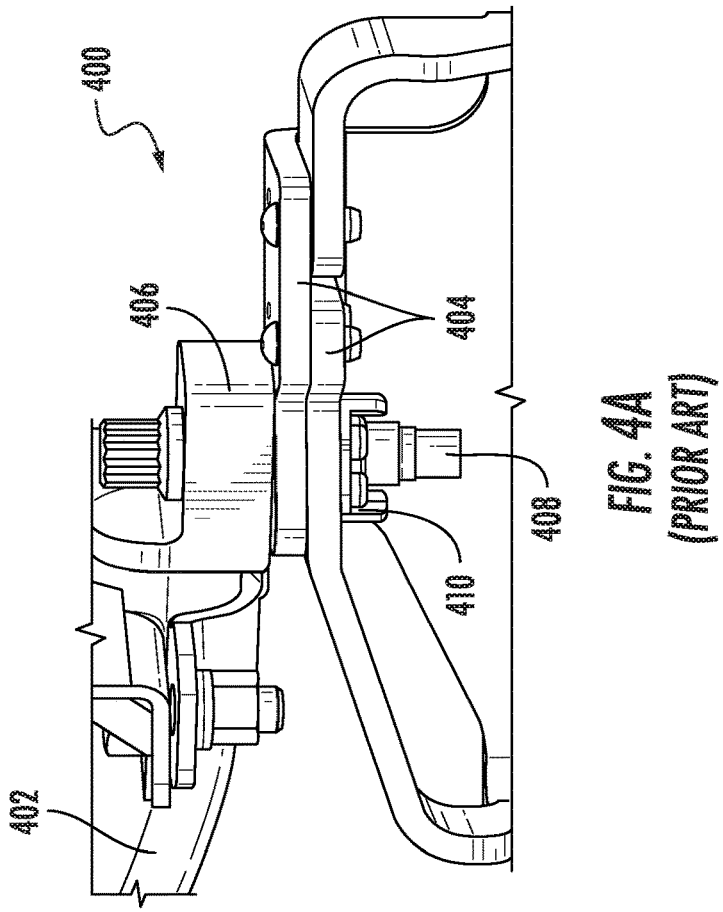
FIG. 4A is a partial isometric illustration of a typical mounting junction within a gas turbine engine.

Turning now to FIGS. 4A-4B, schematic illustrations of a mounting support assembly 400 in accordance with a traditional mounting configuration for a fire and overheat detector system are shown. FIG. 4A is a partial isometric illustration of the mounting support assembly 400 and FIG. 4B is a partial cross-sectional illustration of the mounting support assembly 400. The mounting support assembly 400 represents one connection or mounting arrangement along a length of a fire and overheat detector system. Specifically, as shown, a support tube 402 of a fire and overheat detector system is shown that ends at the mounting support assembly 400. The mounting support assembly 400 provides a fixed connection between the fire and overheat detector system and an engine case or other structure. For example, as shown, an engine case bracket 404, e.g., on an exterior of an engine case, is configured to receive the end of the support tube 402 at a support tube connector 406. A fastener 408, such as a bolt, is configured to provide the connection between the support tube connector 406 and the engine case bracket 404. A securing element 410 is configured to securely engage with the fastener 408. In one non-limiting example, the securing element 410 is a nut or nut plate that threadedly engages with the fastener 408, such as a threaded bolt. The fastening configuration of the mounting support assembly 400 provides for fixed and rigid support of the fire and overheat detector system, but also allows for vibrations to be imparted to the fire and overheat detector system that are generated from an engine.

Embodiments of the present disclosure are directed to providing vibration damping and/or shock resistance to the mounting of fire and overheat detector systems, such as within an or on an aircraft gas turbine engine. Embodiments of the present disclosure provide for a mechanical mechanism for providing and enabling vibration damping and/or absorption without risking or minimizing impacts associated with high temperature on materials of the damping system.

Figure 5A:
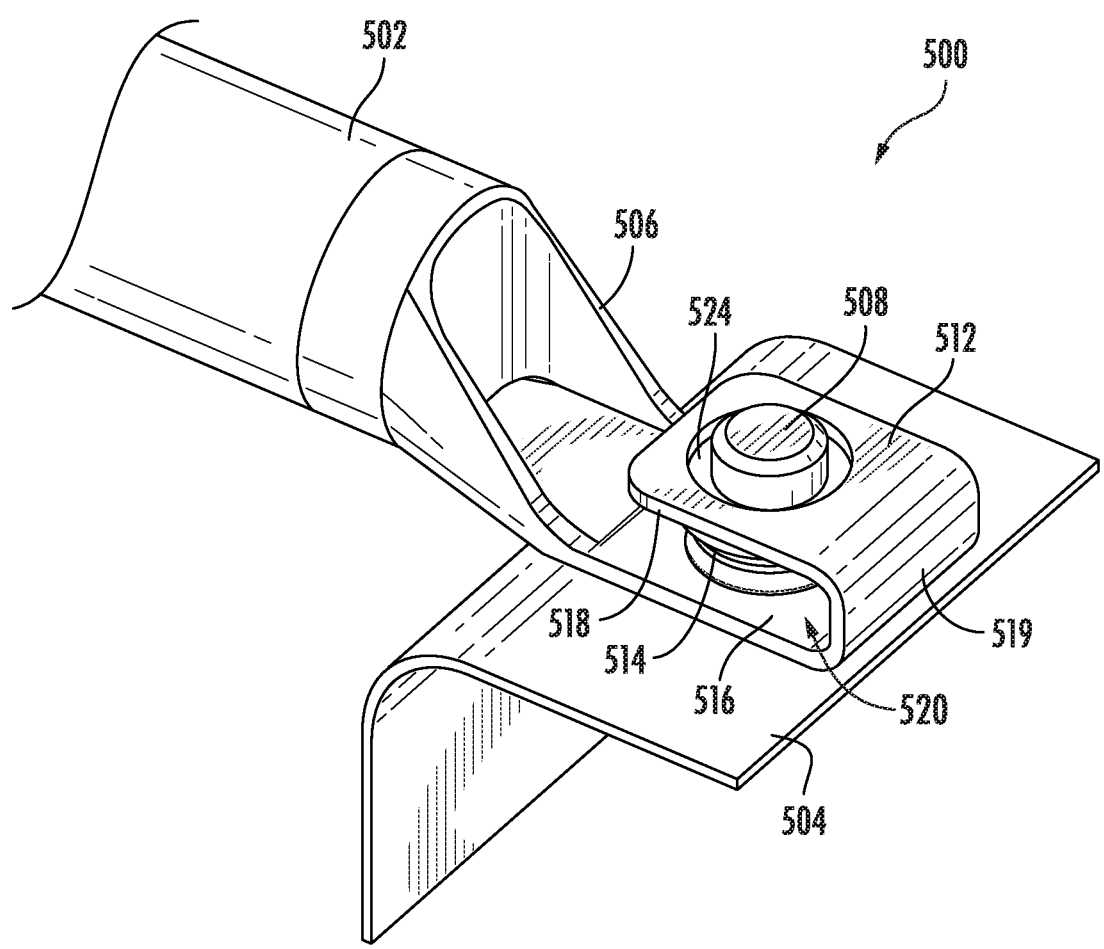
FIG. 5A is a partial isometric illustration of a mounting junction in accordance with an embodiment of the present disclosure.
Figure 5C:
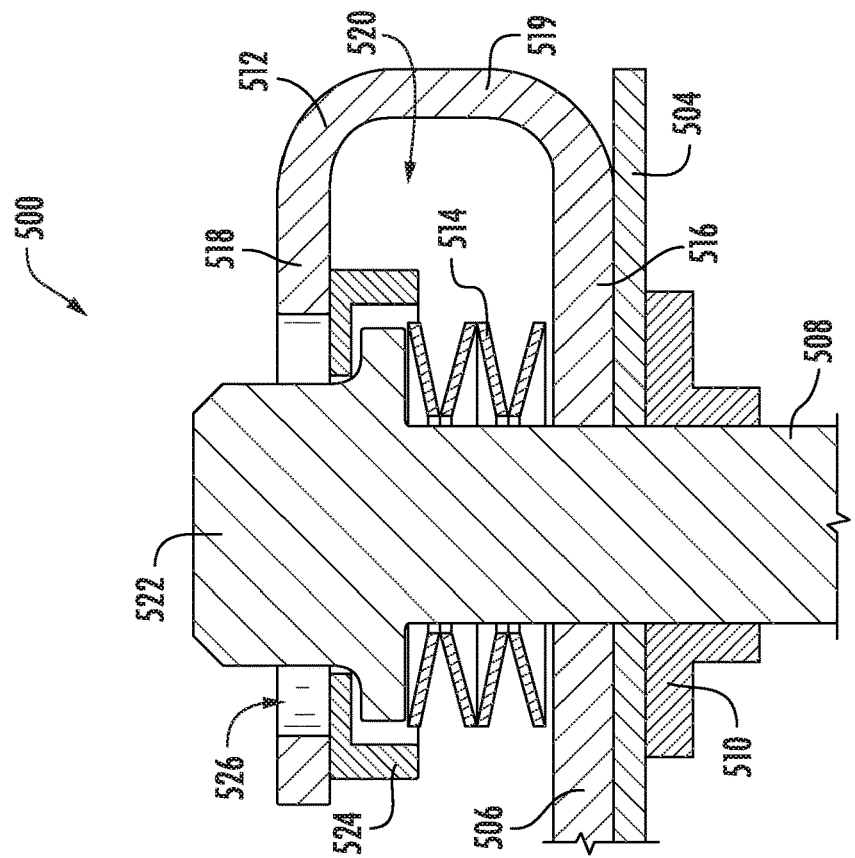
FIG. 5C is an enlarged cross-sectional illustration of a portion of the mounting junction shown in FIGS. 5A-5B.
Figure 5B:
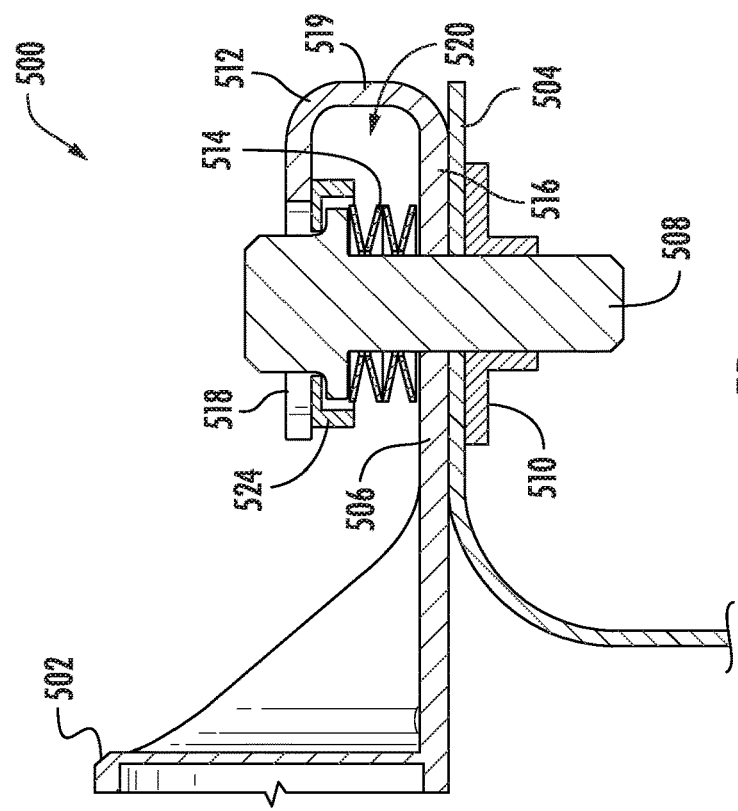
FIG. 5B is a partial cross-sectional illustration of the mounting junction shown in FIG. 5A.

Turning now to FIGS. 5A-5C, schematic illustrations of a mounting support assembly 500 of a fire and overheat detector system in accordance with an embodiment of the present disclosure are shown. FIG. 5A is a partial isometric illustration of the mounting support assembly 500. FIG. 5B is a partial cross-sectional illustration of the mounting support assembly 500. FIG. 5C is an enlarged cross-sectional illustration of a portion of the mounting support assembly 500. The mounting support assembly 500 illustrates the mounting and/or connection of a fire and overheat detector system to a structure of a vehicle, such as an engine case of a gas turbine engine.

The mounting support assembly 500 represents one connection or mounting arrangement along a length of a fire and overheat detector system. Specifically, as shown, a support tube 502 of a fire and overheat detector system is shown that ends at the mounting support assembly 500. The mounting support assembly 500 provides a fixed connection between the fire and overheat detector system and an engine case or other structure. For example, as shown, an engine case bracket 504, e.g., on an exterior of an engine case, is configured to receive the end of the support tube 502 at a support tube connector 506. The support tube connector 506, in some embodiments, may be a plug or other structure that is installable to a tube or rail of a fire and overheat detector system. In other embodiments, the support tube connector 506 may be an integral part of a tube or rail of a fire and overheat detector system.

A fastener 508, such as a bolt, is configured to provide the connection between the support tube connector 506 and the engine case bracket 504. A securing element 510 is configured to securely engage with the fastener 508. In one non-limiting example, the securing element 510 is a nut or nut plate that threadedly engages with the fastener 508, such as a threaded bolt. The fastening configuration of the mounting support assembly 500 provides for fixed and rigid support of the fire and overheat detector system. In contrast to the configuration described with respect to FIGS. 4A-4B, the mounting support assembly 500 provides for vibration damping to be achieved, and the reduce or eliminate vibrations to be imparted to the fire and overheat detector system that are generated from an engine.

To provide for vibration damping, the support tube connector 506 is modified to receive the fastener 508 and allow for an amount of relative movement between the support tube connector 506 and the engine case bracket 504. The support tube connector 506 includes or defines a captive element 512 that is arranged to contact the engine case bracket 504 and also moveably retain or hold the fastener 508. Also arranged within the captive element 512 is a biasing element 514. The biasing element 514 is arranged about the fastener 508 and is arranged to permit or allow the fastener 508 to move relative to the captive element 512 and thus the support tube connector 506 and the fire and overheat detector system to which the support tube connector 506 is a part. The fastener 508 provides a connection between the support tube connector 506 and the engine case bracket 504 and is retained by the securing element 510.

As shown, the captive element 512 is an extension of the material or structure of the support tube connector 506. In this embodiment, the captive element 512 is substantially "U" shaped, with a portion of the fastener 508 and the biasing element 514 arranged or positioned within the interior of the captive element 512. That is, the captive element 512, in this embodiment, includes a first portion 516 that is arranged to contact the engine case bracket 504 and a second portion 518 separated from the first portion 516 and defining a captive space 520 between the first portion 516 and the second portion 518. The first portion 516 is arranged parallel to the second portion 518 and joined by a connector 519. In some embodiments, and as shown, the first portion 516, the second portion 518, and the connector 519 are a continuous and unitary structure forming a single piece or component. That is, in some embodiments, and as shown, a material, such as metal, may be bent to define the first portion 516, the second portion 518, and the connector 519 therebetween, thus defining the captive space 520 therebetween.

The fastener 508 is biased and moveable within the captive space 520 due to the biasing element 514. For example, an end 522 of the fastener 508 may be arranged proximate to the second portion 518 of the captive element 512, but may be moved toward the first portion 516, applying pressure or force upon the biasing element 514. That is, the biasing element 514 is configured between the end 522 of the fastener 508 and the first portion 516, and is configured to apply a biasing force upon the end 522 of the fastener 508 in a direction away from the first portion 516 and toward the second portion 518 such that the fastener 508 or other feature may engaged with and contact the second portion 518. In this embodiment, optionally, a retainer 524 is provided to retain, at least, the biasing element 514 within the captive space 520. The retainer 524 may be configured to engage with, fixedly or non-fixedly, with the end 522 of the fastener 508. The second portion 518, in this illustrative embodiment, includes an aperture 526 through which a portion of the fastener 508 may pass (e.g., the end 522 of the fastener 508).

The biasing element 514 may be, for example, a spring or other structure. In some embodiments, the biasing element may be a wave spring or stack of two or more wave springs. Other embodiments may be implemented using a helical spring, compression springs, Belleville springs/washers, coil springs, leaf springs, washer springs, etc. The biasing element 514 may be formed from a material suitable for high temperature applications (e.g., 300° Celsius or greater). For example, without limitation, the biasing element 514 may be formed from steel, carbon steel, stainless steel, etc., as will be appreciated by those of skill in the art.

In accordance with embodiments, of the present disclosure, the mounting of a fire and overheat detector system may be improved by reducing vibration amplitudes applied to the fire and overheat detector system by providing vibration damping. The vibration damping, as described above, may be achieved with a mount system that mounts to an engine case bracket using mount system based on a biasing element (e.g., wave spring configuration). A support tube of the fire and overheat detector system may include, or have attached thereto, a captive mounting system that includes the biasing element. The biasing elements provide vibration dampening to structural components including the support tube of the fire and overheat detector system. In some embodiments, as noted above, the vibration dampening system can consist of a stack of wave springs arranged to absorb vibration magnitudes from the engine and isolate the fire and overheat detector system from engine excitations. Thus, the mounting system of the present disclosure may be referred to, depending on the specific configuration, as a wave spring isolator mount system.

Advantageously, embodiments described herein provide for improved vibration damping that is experienced by fire and overheat detector systems on vehicles, and specifically, for example, on gas turbine engines. The systems described herein enable high-temperature environment vibration damping. The systems described herein can be implemented at all engine bracket mount locations of a fire and overheat detector system. Advantageously, embodiments described herein may be more reliable compared elastomer type isolators, particularly with respect to part life and thermal robustness. Furthermore, embodiments described herein enable improved life of the sensor elements of the fire and overheat detector due to reduced vibration stress and fatigue. As noted above, advantageously, the systems described herein can be used in high temperature applications and may be generically applied or used for mounting any structure to another structure, particularly where vibration damping may be desired.

The term "about" is intended to include the degree of error associated with measurement of the particular quantity based upon the equipment available at the time of filing the application. For example, "about" can include a range of ±8% or 5%, or 2% of a given value, or variations thereon based on the technology and concepts involved with a particular value or range, and as understood by those of skill in the particular art. Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mounting support assembly for a fire and overheat detection system, the mounting support assembly comprising:
   a support tube connector having a first portion and a second portion, wherein the first portion is arranged parallel to the second portion and joined by a connector in a U-shape, wherein a captive space is defined between the first portion, the second portion, and the connector;
   a fastener arranged at least partially within the captive space and passing through the first portion of the support tube connector; and
   a biasing element arranged about the fastener and positioned between an end of the fastener and the first portion of the support tube connector within the captive space, the biasing element biasing the fastener in a direction toward the second portion.

2. The mounting support assembly of claim 1, wherein the support tube connector is configured to be installed to a tube of the fire and overheat detection system.

3. The mounting support assembly of claim 1, wherein the biasing element comprises one or more wave springs.

4. The mounting support assembly of claim 1, wherein the biasing element is formed from steel, carbon steel, or stainless steel.

5. The mounting support assembly of claim 1, further comprising a retainer configured to retain the biasing element within the captive space.

6. The mounting support assembly of claim 1, wherein the second portion includes an aperture arranged to allow an end of the fastener to pass therethrough.

7. The mounting support assembly of claim 1, further comprising a securing element configured to engage with a portion of the fastener.

8. A fire and overheat detection system, comprising:
   at least one sensor element attached to a tube;
   a support tube connector at an end of the tube, the support tube connector having a first portion and a second portion, wherein the first portion is arranged parallel to the second portion and joined by a connector in a U-shape, wherein a captive space is defined between the first portion, the second portion, and the connector;
   a fastener arranged at least partially within the captive space and passing through the first portion of the support tube connector, the fastener configured to attach the support tube connector to a bracket of a vehicle; and
   a biasing element arranged about the fastener and positioned between an end of the fastener and the first portion of the support tube connector within the captive space, the biasing element biasing the fastener in a direction toward the second portion.

9. The fire and overheat detection system of claim 8, wherein the support tube connector is configured to be installed to the tube.

10. The fire and overheat detection system of claim 8, wherein the support tube connector is integrally formed with the tube.

11. The fire and overheat detection system of claim 8, wherein the biasing element comprises one or more wave springs.

12. The fire and overheat detection system of claim 8, wherein the biasing element is formed from steel, carbon steel, or stainless steel.

13. The fire and overheat detection system of claim 8, further comprising a retainer configured to retain the biasing element within the captive space.

14. The fire and overheat detection system of claim 8, wherein the second portion includes an aperture arranged to allow an end of the fastener to pass therethrough.

15. The fire and overheat detection system of claim 8, further comprising a securing element configured to engage with a portion of the fastener.

16. The fire and overheat detection system of claim 8, wherein the bracket is an engine bracket of a gas turbine engine.

17. A gas turbine engine comprising:
   an engine case;
   an engine case bracket on an exterior of the engine case; and
   a fire and overheat detection system mounted to the engine case, the fire and overheat detection system comprising:
      at least one sensor element attached to a tube;
      a support tube connector at an end of the tube, the support tube connector having a first portion and a second portion, wherein the first portion is arranged parallel to the second portion and joined by a connector in a U-shape, wherein a captive space is defined between the first portion, the second portion, and the connector;
      a fastener arranged at least partially within the captive space and passing through the first portion of the support tube connector, the fastener configured to attach the support tube connector to the engine case; and
      a biasing element arranged about the fastener and positioned between an end of the fastener and the first portion of the support tube connector within the captive space, the biasing element biasing the fastener in a direction toward the second portion.

18. The gas turbine engine of claim 17, wherein the biasing element comprises one or more wave springs.

19. The gas turbine engine of claim 17, further comprising a retainer configured to retain the biasing element within the captive space.

20. The gas turbine engine of claim 17, further comprising a securing element configured to engage with a portion of the fastener and secure the support tube connector to the engine case bracket.

* * * * *